Jan. 14, 1964     F. A. RIPEPE     3,117,549
SAFETY WARNING SIGNAL FOR VEHICLES
Filed April 9, 1962     2 Sheets-Sheet 1
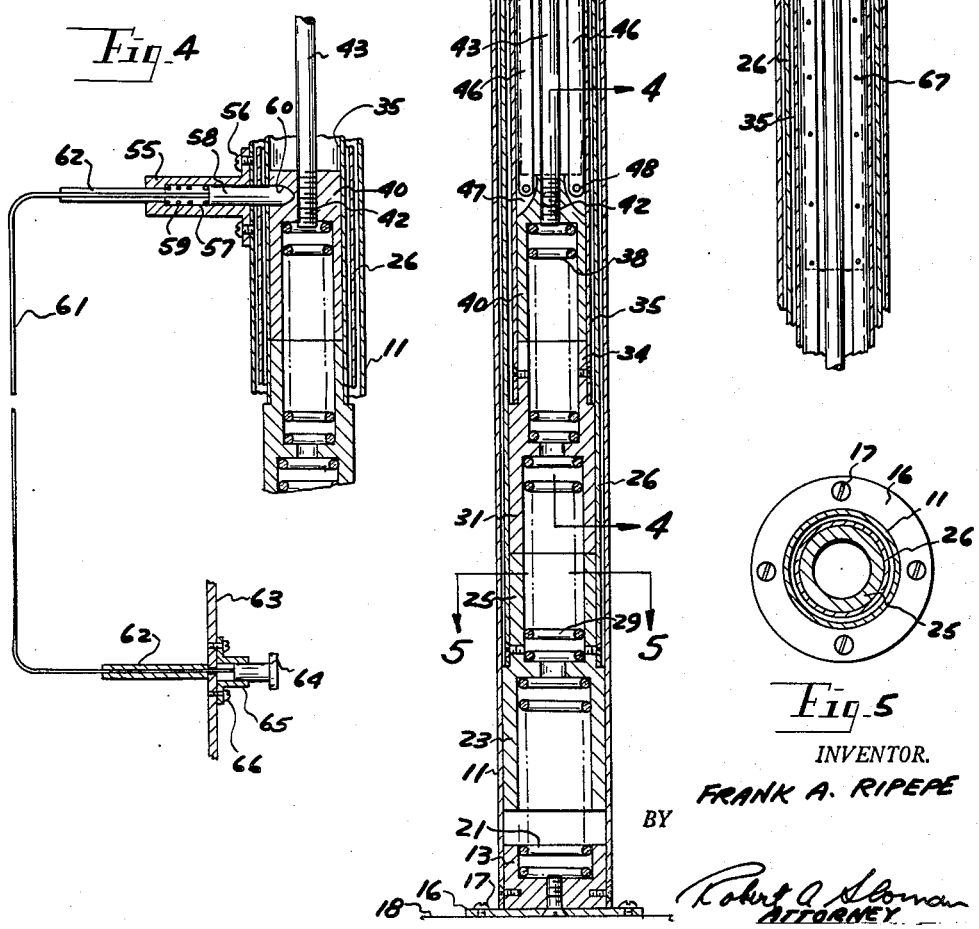
INVENTOR.
FRANK A. RIPEPE
BY
Robert A. Sloman
ATTORNEY Jan. 14, 1964   F. A. RIPEPE   3,117,549
SAFETY WARNING SIGNAL FOR VEHICLES
Filed April 9, 1962   2 Sheets-Sheet 2
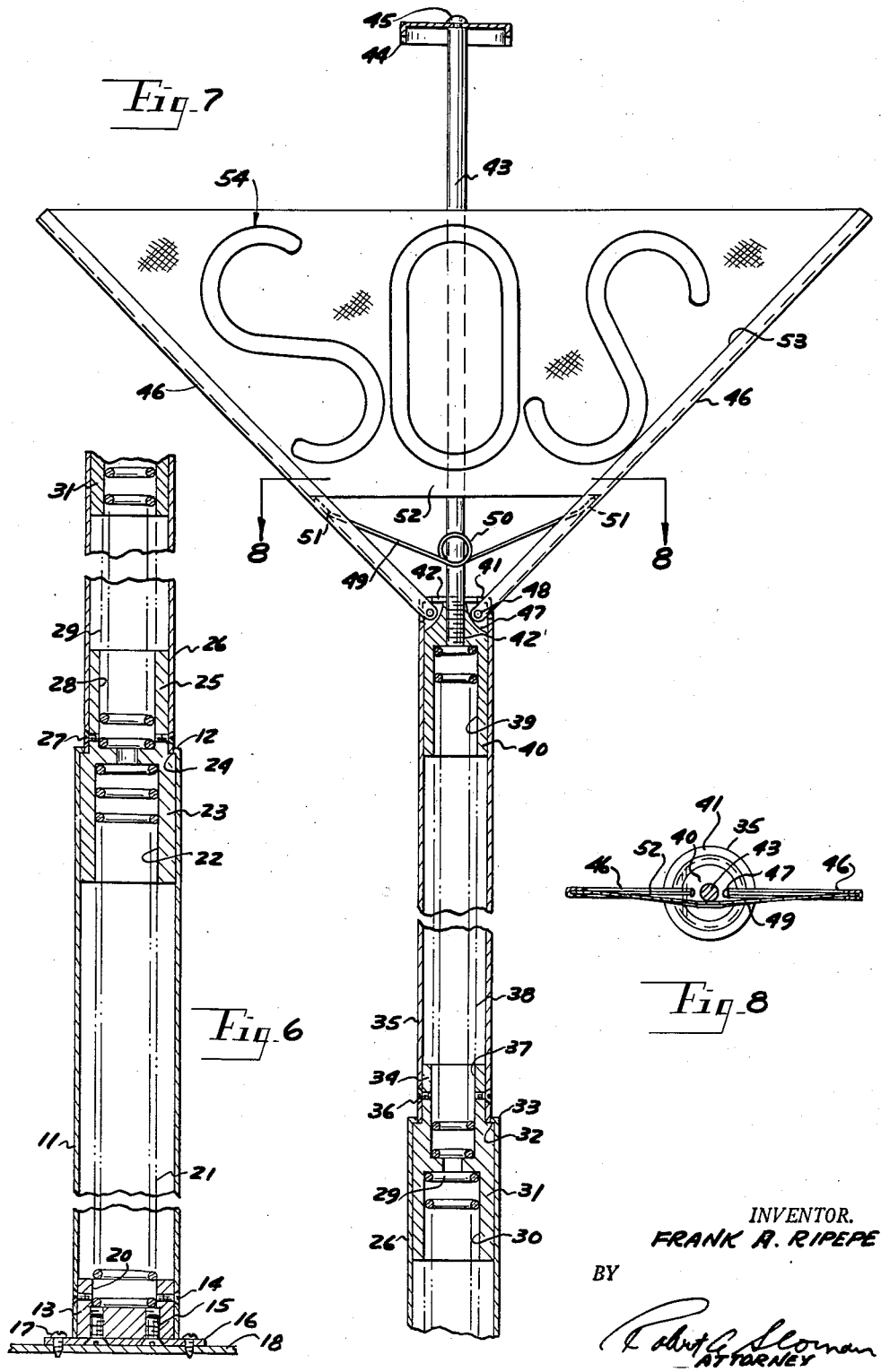
INVENTOR.
FRANK A. RIPEPE.
BY

United States Patent Office 3,117,549
Patented Jan. 14, 1964

3,117,549
SAFETY WARNING SIGNAL FOR VEHICLES
Frank A. Ripepe, 1541 Chateaufort Place, Detroit, Mich.
Filed Apr. 9, 1962, Ser. No. 185,923
1 Claim. (Cl. 116—28)

The present invention relates to signal devices for vehicles, and more particularly to a safety warning signal retained in a retracted position upon the vehicle.

Heretofore, due to emergencies, or for other reasons, vehicles moving along a travel highway or a throughway, are required to stop, to pull over to the side of the road, and wherein limited means are presently available to the driver of the vehicle in order to give a warning to vehicles behind him where a change will be made in his progress, either in speed or in direction.

It is therefore the object of the present invention to provide upon the rear of the vehicle a safety warning signal device which can be activated by the driver within the vehicle and which will give a visible warning signal to oncoming drivers from the rear which can indicate Danger or SOS, or any other message.

It is another object of the present invention to provide a collapsible device which is stored normally within the vehicle body, preferably below the deck and adjacent the trunk compartment, which upon manual release by the driver, will permit the automatic extension of a safety signalling mechanism, such as an SOS signal, or will otherwise elevate and expand a flag to call attention to oncoming drivers from the rear that the car is about to stop, or is about to change lanes, or merely to indicate its parked position on the side of the highway.

It is another object of the present invention to provide a warning signal device in the nature of a series of telescoping tubes, or supports which are mounted within the vehicle body and normally retained in a retracted position and wherein the outermost of the supporting tubes carries a flag or other signal strip which is normally collapsed when stored, but which when elevated, becomes released so as to give a message or warning to the oncoming driver.

These and other objects will be seen from the following specification and claim in conjunction with the appended drawings in which:

FIG. 1 is a rear elevational view of a vehicle with the present safety warning signal in extended use position, as it would be viewed by an oncoming driver from the rear of the vehicle shown.

FIG. 2 is an elevational section partially broken away illustrating the construction and arrangement of the telescoping tubes and support tube, as mounted upon the floor of the vehicle storage compartment.

FIG. 3 is a fragmentary elevational section of the upper portion of the telescoping structure shown in FIG. 2, showing the relationship of parts when collapsed with respect to the vehicle deck.

FIG. 4 is a fragmentary section taken on line 4—4, FIG. 2 also illustrating the construction of the remote controlled manual release means for the safety signal device.

FIG. 5 is a section taken on the line 5—5 of FIG. 2.

FIG. 6 is a fragmentary section of the lower portion of the present signal device showing the lowermost telescoping tube in fully extended position with respect to the support tube.

FIG. 7 is a fragmentary vertical section complementing FIG. 6, being a continuation thereof, illustrating the expanded position of the safety signal in the use position corresponding to that shown in FIG. 1.

FIG. 8 is a fragmentary section taken on line 8—8 of FIG. 7.

It will be understood that the above drawings illustrate merely a preferred embodiment of the invention and that other embodiments are contemplated within the scope of the claim hereafter set forth.

Referring to the drawings, the rear portion of a vehicle is shown in FIG. 1, which includes a conventional rear deck 19, and adjacent thereto a rear storage compartment which has a floor 18, as fragmentarily shown in FIGS. 2 and 6.

The present safety signal device includes an upright support tube 11, whose top wall is apertured as at 12 to define a retaining shoulder, as hereinafter described.

Base 13 is secured within the lower end of tube 11 by fasteners 14 and itself is secured to the mounting flange or disc 16 by the fasteners 15. The mounting flange or plate 16 is itself fixed to the floor of the storage compartment as at 18 by a series of fasteners 17 also shown in FIG. 5, as well as FIG. 2.

As shown in FIG. 3, the upper end of the support tube 11 projects through and engages the deck 19, there being a suitable flexible or sealing grommet interposed therebetween, as shown at 55. Base 13 shown at FIGS. 2 and 6 has an axial socket 20 adapted to cooperatively and supportably receive the lower end of coiled spring 21 whose upper end is retained within socket 22 in the cylindrical guide 23. Guide member 23 includes the upwardly extending guide member 25 of reduced diameter defining the shoulder 24, guide member 25 being fixedly secured to telescoping tube 26 at its lower end as by the fasteners 27, FIG. 6.

The telescoping tube 26, fragmentarily shown in FIG. 6 is shown in its fully expanded position so that the shoulder 24 of the guide member 23—25 retainingly engages the corresponding shoulder defined in the top wall 12 of the support tube 11. The upper end of the coiled spring 21 is nested within the socket 22 of guide 23 normally urging the guide member and the connected telescoping tube 26 to the elevated position shown in FIG. 6.

Guide 25 is axially socketed at 28 to cooperatively and supportably receive the lower end of coil spring 29, whose upper end is cooperatively received within a corresponding socket 30 formed in guide 31. As shown in FIG. 7, guide 31 has a shoulder 32 intermediate its end adapted to cooperatively engage the apertured top wall 33 of telescoping tube 26 in order to limit the outward upward movement of guide 31. Guide 31 includes the extension 34 of reduced diameter which projects up into the second telescoping tube 35 and is fixedly secured thereto, as by the fasteners 36.

The guide 34 has an axial socket 37 on its upper portion, adapted to cooperatively receive and support the coiled spring 38, which extends the length of the telescoping tube 35, as shown in FIG. 7, and is nested within a corresponding socket 39 in the undersurface of the reciprocal plunger 40, which is movably positioned within the upper end portion of telescoping tube 35.

Viewing FIGS. 6 and 7 together, there is shown the expanded position of the telescoping tubes 35 and 26 with respect to the stationary upright support tube 11. Telescoping tube 26 is normally urged to its outermost position, shown in FIG. 6, by coiled spring 21. Similarly the telescoping tube 35 is urged to its outermost position by the coiled spring 29. The additional coiled spring 38 is interposed between the socketed guide 31—34, shown in FIG. 7, and the socketed end 39 of the reciprocal plunger 40 as retained by the apertured top wall 41 of telescoping tube 35.

In this construction, it is seen in FIG. 6 that the guide 23 is movably positioned within support tube 11, and at its upper end is fixedly secured to telescoping tube 26.

Similarly guide 31 is movably positioned within telescoping tube 26, and at its upper end is fixedly secured to the upper telescoping tube 35. Furthermore, the plunger 40 is retractable manually as hereafter described against the action of coiled spring 38 and is therefore movable within the telescoping tube 35 and will take the retracted position shown in FIGS. 2 and 3.

The upright rod 43 at its lower end is axially secured at 42 to the plunger 40, and at its upper end has secured axially thereto as at 45 the downturned cup 44 to thus provide a means for depressing and retracting the plunger 40 with respect to telescoping tube 35, and progressively retracting the telescoping tube 35, as well as telescoping tube 26 with respect to the support tube 11 to the collapsed retracted position shown in FIGS. 2 and 3.

A pair of arms 46 at their lower ends project within oppositely arranged slots 47 within the upper end of plunger 40, and are pivotally connected thereto as at 48, said arms 46 extending through corresponding slots 41' formed through the upper portion of the telescoping tube 35, as best shown in FIG. 7.

The formed spring 49 is centrally anchored as at 50 to the rod 43 with the free ends of said spring as at 51, secured to intermediate portions of the arms 46, normally urging the arms to the diverging position shown in FIG. 7 and for expanding the flexible and collapsible signal strip 52 of a suitable material whose tapered edge portions are secured to outer portions of the arms 46, as at 53, as by stitching or by riveting or any other convenient means.

The signal strip 52 may have thereon any suitable indicia, or may be made of a predetermined color such as a red cloth or canvas. In the illustrative embodiment of the invention, the indicia employed are a series of letters as indicated at 54 to show the word SOS. This word could be replaced by any other attractive notation, such as Danger, or Stop, or any other suitable warning signal.

It is seen in the illustrative embodiment of the invention that in order to collapse the signal from the use position shown in FIG. 1, as well as FIG. 7, shaft 43, and associated cap 44 with downturned flange, is pressed axially downward. Preferably the arms 46 are manually brought together, and at the same time the plunger 40 is retracted within the telescoping tube 35 against the action of the spring 38. At this time the arms 46 are in parallel spaced relation and the strip 52 has been collapsed so that the said strip and arms are movably positioned within the outer telescoping tube 35 in the manner designated in FIGS. 2 and 3, which represent the fully retracted position of the parts.

As a part of the present invention, there is incorporated a manually releasable means which is suitably mounted upon the support tube for the purpose of retaining the telescoping tubes 26 and 35, as well as the plunger 40 in retracted storage position. Such manually releasable means are best illustrated in FIG. 4, and include housing 55 extending normally of support tube 11 and fixedly secured thereto at 56, and including bore 57 within which is movably mounted the locking pin 58.

Coil spring 59 is normally interposed in compression between the said housing 55 and the inner end of pin 58 normally urging the same to the locking position within the transverse bore 60, formed through the upper end portion of the reciprocal plunger 40. The locked position with the plunger retained in retracted position and with the telescoping tubes similarly retracted, corresponds to the position of the parts shown in FIGS. 2 and 3.

For this purpose, a lateral aperture is formed through the support tube 11 in registry with the bore 57 of the housing 55, and corresponding laterally aligned apertures are formed through the walls of the telescoping tubes and corresponding to the bore 60 within the plunger so that with the parts fully retracted as shown in FIG. 4, the locking pin 58 under the expansive action of its coil spring 59 will automatically lock and retain all of the parts in retracted position.

In the present construction, the manually releasable means of course includes a remote control operated by the driver by which the anchor or locking pin 58 may be retracted so that the device automatically opens up to the position shown in FIGS. 6 and 7, and is also shown in FIG. 1.

For this purpose the vehicle dashboard is fragmentarily shown at 63, FIG. 4 and secured thereto at 66 is an apertured guide 65 adapted to slidably receive the handle 64, which is secured to the outer end of the flexible cable 61. The said cable 61 is adapted for longitudinal movement within its supporting sleeve 62, which supporting sleeve extends from the dashboard 63 to the housing 55, shown in FIG. 4.

On retraction of the handle 64, and similar rearward movement of the cable 61, which cable is fixedly secured to the locking pin 58, it is seen that the said locking pin 58 will be retracted from the bore 60 and the plunger 61 and with respect to the corresponding apertures in the two telescoping tubes 26 and 35. Immediately under the expansive action of the three springs 21, 29 and 38, the said telescoping tubes will be automatically elevated to the position shown in FIGS. 6 and 7, and at the same time the plunger 40 will move to the outermost position shown.

Just as soon as the plunger has achieved this position shown in FIG. 7, the arms 46 under the expansive action of the previously retracted spring 49 will assume the diverging position shown stretching out the signal strip 52, as indicated, and so that its message may be readily viewable from the rear of the car, as indicated in FIG. 1. The cap 44 when retracted, as shown in FIG. 3, overlies the upper end of the support tube 11, by which the complete assembly is enclosed in retracted position, ready for the next usage.

In the operation of the present device, each of the telescoping tubes 26 and 35 have secured at their lower ends the guides 25 and 31, respectively, which guides at their lower ends terminate in the enlarged cylindrically shaped guide members 23 and 31 respectively, which are movably positioned within support tube 11, as in FIG. 6, and within the upper end of the telescoping tube 26, as shown in FIG. 7.

Accordingly, the telescoping tubes are guidably mounted with respect to each other and with respect to the support tube 11 to facilitate the longitudinal movements of the said telescoping tubes with respect to the support tube 11 and to facilitate the collapsing of the parts to the storage position shown in FIGS. 2, 3 and 4.

It is contemplated as a part of the present invention that the safety warning signal device may be attached at other places on the vehicle other than the trunk compartment and deck. For example, the signal device may be mounted upon the vehicle body or upon the bumper of a car or truck, or upon a trailer, or upon a portion of a boat.

The primary purpose is that suitable support means be employed to mount the device to utilize the principle of the present invention.

Having described my invention, reference should now be had to the following claim.

I claim:

A safety warning signal for a vehicle having a rear deck and a storage compartment with a floor; an upright support tube within said compartment at its lower end secured to said floor and at its upper end projected through and engaging said deck, a pair of reciprocal telescoping tubes axially positioned within said support tube, oppositely socketed guide members secured within the lower ends of said telescoping tubes respectively, each guide member including a depending cylindrical portion of increased diameter guidably and movably positioned within the respective tube thereunder, coiled springs interposed respectively between the outer telescoping tube and support tube, and between the telescoping tubes, a socketed plunger movably mounted within the inner telescoping tube, a coiled spring interposed between said plunger and the lower end of said inner telescoping tube, said springs being in compression when said telescoping tubes are retracted within said support tube and said plunger within its tube, manually releasable means on said support tube, retaining said telescoping tubes and said plunger in said retracted position respectively, a pair of arms at their lower ends pivotally connected to said plunger, a flexible collapsible signal strip interposed between and secured to said arms, spring means interposed between said arms normally urging them apart, said arms being parallel and the strip collapsed, and movably nested within the outermost telescoping tube when said plunger is retracted therein, said telescoping tubes and said plunger on activation of said releasable means moving longitudinally outward relative to said support tube and telescoping tubes respectively under the action of said springs, said arms upon disengagement from said outermost telescoping tube diverging outwardly displaying said signal strip, said manually releasable means including a housing with a bore and mounted on said support tube transversely thereof, a locking pin in said bore, and a coiled spring interposed in compression between said housing and pin, there being transverse apertures in said support tube, telescoping tube and plunger adapted for alignment with said bore, said pin under the action of said latter spring automatically moving through said apertures when aligned for retaining said telescoping tube and plunger in retracted position, said vehicle including a dashboard, and a flexible cable having a handle on one end projected through said dashboard and at its other end connected to said locking pin.

References Cited in the file of this patent

UNITED STATES PATENTS

| | | |
|---|---|---|
| 1,248,229 | Wilke | Nov. 27, 1917 |
| 2,538,885 | Schumann | Jan. 23, 1951 |
| 2,843,836 | MacDonald | July 15, 1958 |
| 2,924,811 | Poppess et al. | Feb. 9, 1960 |

FOREIGN PATENTS

| | | |
|---|---|---|
| 2,925 | Sweden | Aug. 26, 1890 |